US006884312B2

(12) United States Patent
Mitchell et al.

(10) Patent No.: US 6,884,312 B2
(45) Date of Patent: Apr. 26, 2005

(54) APPARATUS FOR PRINTING AND APPLYING TAPE AND METHODS OF PRINTING AND APPLYING TAPE

(75) Inventors: Michael R. Mitchell, St. Paul, MN (US); Steven G. Lucht, Maplewood, MN (US); Lloyd S. Vasilakes, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 100 days.

(21) Appl. No.: 10/121,536

(22) Filed: Apr. 12, 2002

(65) Prior Publication Data

US 2003/0192639 A1 Oct. 16, 2003

(51) Int. Cl.[7] .......................... B32B 31/00; B32B 35/00

(52) U.S. Cl. ....................... 156/277; 156/256; 156/387; 156/510; 156/517

(58) Field of Search ................................ 156/256, 264, 156/277, 384, 387, 510, 519, 521, 556, DIG. 1, DIG. 2, DIG. 24, DIG. 28, DIG. 33, DIG. 37, DIG. 38, DIG. 47, DIG. 49

(56) References Cited

U.S. PATENT DOCUMENTS 2,492,908 A 12/1949 Von Hofe
2,532,011 A 11/1950 Dahiquist et al.
2,607,711 A 8/1952 Hendricks (Continued)

FOREIGN PATENT DOCUMENTS

| | | | |
|---|---|---|---|
| CH | 687 193 | | 10/1996 |
| DE | 32 34 556 | A1 | 5/1984 |
| DE | 37 27 667 | A1 | 3/1989 |

(Continued)

OTHER PUBLICATIONS

US 4,909,885, 3/1990, Swenson (withdrawn)

3M Innovative Properties Co., "3M–Matic™ Corner Label Applicator CA2000" Brochure, © 1999.

*Research Disclosure*, Nov. 1994, No. 367.

(Continued)

*Primary Examiner*—Melvin C. Mayes
(74) *Attorney, Agent, or Firm*—Melissa E. Buss

(57) ABSTRACT

An apparatus for printing and applying tape. A preferred embodiment of the invention provides an apparatus that includes a printer for printing on tape, a tape puller that pulls the printed tape out from the printer, and an applicator that applies the printed tape to an object. The present invention also generally relates to methods of printing and applying tape to objects.

38 Claims, 10 Drawing Sheets

U.S. PATENT DOCUMENTS

| | | | | |
|---|---|---|---|---|
| 2,788,625 A | | 4/1957 | Larsen et al. | |
| 2,990,081 A | | 6/1961 | De Neui et al. | |
| 3,561,190 A | | 2/1971 | Derenthal | |
| 3,616,086 A | * | 10/1971 | Nooder | 156/518 |
| 3,657,051 A | | 4/1972 | McCarthy | |
| 3,905,859 A | | 9/1975 | Patterson | |
| 3,963,557 A | | 6/1976 | Patterson | |
| 3,989,575 A | | 11/1976 | Davies et al. | |
| 4,001,072 A | | 1/1977 | deNeui | |
| 4,072,224 A | | 2/1978 | Barnaby et al. | |
| 4,101,366 A | * | 7/1978 | Teraoka et al. | 156/378 |
| 4,161,138 A | | 7/1979 | Marchetti | |
| 4,200,483 A | | 4/1980 | Hoveler | |
| 4,227,955 A | | 10/1980 | Woods et al. | |
| 4,256,528 A | | 3/1981 | Patterson | |
| 4,295,915 A | * | 10/1981 | Sakaguchi et al. | 156/361 |
| 4,321,103 A | | 3/1982 | Lindstrom et al. | |
| 4,363,685 A | | 12/1982 | White | |
| 4,388,143 A | | 6/1983 | Buchholz et al. | |
| 4,389,009 A | | 6/1983 | Yamashita | |
| 4,421,817 A | | 12/1983 | Pina et al. | |
| 4,427,144 A | | 1/1984 | Macgrory et al. | |
| 4,432,830 A | | 2/1984 | Jue | |
| 4,561,921 A | * | 12/1985 | Treiber | 156/297 |
| 4,577,199 A | | 3/1986 | Saiki et al. | |
| 4,676,859 A | | 6/1987 | Cleary, Jr. et al. | |
| 4,707,211 A | | 11/1987 | Shibata | |
| 4,717,621 A | | 1/1988 | So et al. | |
| 4,784,714 A | | 11/1988 | Shibata | |
| 4,807,177 A | | 2/1989 | Ward | |
| 4,815,871 A | | 3/1989 | McGourty et al. | |
| 4,839,742 A | | 6/1989 | Nakatani et al. | |
| 4,857,134 A | | 8/1989 | Lin | |
| 4,889,581 A | | 12/1989 | Ulrich et al. | |
| 5,037,219 A | | 8/1991 | Duport | |
| 5,040,461 A | | 8/1991 | Van-Ocker | |
| 5,121,586 A | | 6/1992 | Focke | |
| 5,168,814 A | | 12/1992 | Kuzuya et al. | |
| 5,193,926 A | | 3/1993 | Kuzuya et al. | |
| 5,209,808 A | | 5/1993 | Booth | |
| 5,227,002 A | | 7/1993 | Faust et al. | |
| 5,242,888 A | | 9/1993 | Atherton et al. | |
| 5,261,996 A | | 11/1993 | Rossini | |
| 5,286,332 A | | 2/1994 | Rossini | |
| 5,292,713 A | | 3/1994 | Stenzel et al. | |
| 5,295,753 A | | 3/1994 | Godo et al. | |
| 5,302,034 A | | 4/1994 | Kitazawa | |
| 5,304,264 A | * | 4/1994 | Wehrmann | 156/64 |
| 5,308,173 A | | 5/1994 | Amano et al. | |
| 5,354,588 A | | 10/1994 | Mitchell et al. | |
| 5,376,418 A | | 12/1994 | Rogers et al. | |
| 5,379,962 A | | 1/1995 | Albrecht et al. | |
| 5,399,036 A | | 3/1995 | Yamaguchi | |
| 5,413,651 A | | 5/1995 | Otruba | |
| 5,419,648 A | | 5/1995 | Nagao et al. | |
| 5,425,823 A | | 6/1995 | Woodside, III | |
| 5,431,763 A | | 7/1995 | Bradshaw | |
| 5,437,228 A | | 8/1995 | Uland | |
| 5,443,318 A | | 8/1995 | Kitazawa | |
| 5,482,593 A | | 1/1996 | Kuhn et al. | |
| 5,487,337 A | | 1/1996 | Uland | |
| 5,494,360 A | | 2/1996 | Watanabe et al. | |
| 5,497,701 A | | 3/1996 | Uland | |
| 5,503,485 A | | 4/1996 | Nakazato | |
| 5,524,996 A | | 6/1996 | Carpenter et al. | |
| 5,531,853 A | | 7/1996 | Cubow et al. | |
| 5,540,369 A | | 7/1996 | Boreali et al. | |
| 5,540,795 A | * | 7/1996 | Franklin et al. | 156/64 |
| 5,549,783 A | | 8/1996 | Schroeder et al. | |
| 5,560,293 A | | 10/1996 | Boreali et al. | |
| 5,569,515 A | | 10/1996 | Rice, II et al. | |
| 5,614,928 A | | 3/1997 | Matsuda | |
| 5,658,647 A | | 8/1997 | Magill et al. | |
| 5,661,099 A | | 8/1997 | Mitchell, Jr. | |
| 5,674,345 A | | 10/1997 | Nash | |
| 5,674,626 A | | 10/1997 | Khatib et al. | |
| 5,675,369 A | | 10/1997 | Gaskill | |
| 5,718,525 A | | 2/1998 | Bruhnke et al. | |
| 5,750,004 A | | 5/1998 | Wurz et al. | |
| 5,782,496 A | | 7/1998 | Casper et al. | |
| 5,832,827 A | | 11/1998 | Pistro et al. | |
| 5,843,252 A | * | 12/1998 | Murphy | 156/64 |
| 5,857,789 A | | 1/1999 | Day et al. | |
| 5,865,918 A | | 2/1999 | Franklin et al. | |
| 5,874,499 A | | 2/1999 | Shipston et al. | |
| 5,879,507 A | | 3/1999 | Schroeder et al. | |
| 5,897,741 A | * | 4/1999 | Mills et al. | 156/541 |
| 5,940,107 A | | 8/1999 | Fox | |
| 5,997,193 A | | 12/1999 | Petterutti et al. | |
| 6,006,808 A | * | 12/1999 | Ewert et al. | 156/556 |
| 6,007,263 A | | 12/1999 | Imai et al. | |
| 6,049,347 A | | 4/2000 | Ewert et al. | |
| 6,053,231 A | | 4/2000 | Matsuguchi | |
| 6,067,103 A | | 5/2000 | Ewert et al. | |
| 6,182,730 B1 | * | 2/2001 | Muir | 156/387 |
| 6,199,614 B1 | * | 3/2001 | Snyder et al. | 156/387 |
| 6,273,170 B1 | * | 8/2001 | Finn et al. | 156/542 |
| 6,276,851 B1 | | 8/2001 | Kurashina | |
| 2002/0090244 A1 | * | 7/2002 | Wood et al. | 400/621 |

FOREIGN PATENT DOCUMENTS

| | | | | |
|---|---|---|---|---|
| DE | 44 12 091 | A1 | | 10/1995 |
| DE | 195 35 535 | A1 | | 3/1997 |
| DE | 196 09 431 | A1 | | 9/1997 |
| EP | 0 083 404 | A1 | * | 7/1983 |
| EP | 0 096 841 | | | 12/1983 |
| EP | 0 170 172 | A1 | | 2/1986 |
| EP | 0 316 215 | | * | 5/1989 |
| EP | 0 579 423 | A1 | | 1/1994 |
| EP | 0 637 547 | A1 | | 2/1995 |
| EP | 0 673 839 | A1 | | 9/1995 |
| EP | 0 688 008 | A1 | | 12/1995 |
| EP | 0 854 051 | A1 | | 7/1996 |
| EP | 0 763 471 | A1 | | 3/1997 |
| EP | 0 834 404 | A2 | | 4/1998 |
| GB | 1 079 233 | | | 8/1967 |
| GB | 2 243 135 | | | 10/1991 |
| GB | 2 325 453 | | | 11/1998 |
| JP | 57-32990 | | | 2/1982 |
| JP | 10/101043 | | | 4/1998 |
| JP | 2000-247508 | | | 9/2000 |
| JP | 2001-98814 | | | 4/2001 |
| JP | 2002-02026 | | | 1/2002 |
| WO | WO 92/07347 | | | 4/1992 |
| WO | WO 93/09195 | | | 5/1993 |
| WO | WO 95/31800 | | | 11/1995 |
| WO | WO 96/10489 | | | 4/1996 |
| WO | WO 96/21557 | | | 7/1996 |
| WO | WO 96/26864 | | | 9/1996 |
| WO | WO 96/40508 | | | 12/1996 |
| WO | WO 97/05021 | | | 2/1997 |
| WO | WO 97/10148 | | | 3/1997 |
| WO | WO 97/14616 | | | 4/1997 |
| WO | WO 97/15501 | | | 5/1997 |
| WO | WO 94/43744 | | | 11/1997 |
| WO | WO 97/749389 | | | 12/1997 |
| WO | WO 98/42578 | | | 10/1998 |
| WO | WO 99/20468 | | | 4/1999 |
| WO | WO 99/54860 | | | 10/1999 |
| WO | WO 99/61322 | | | 12/1999 |
| WO | WO 00/34131 | | | 6/2000 |

| | | | |
|---|---|---|---|
| WO | WO 00/76853 A1 | | 12/2000 |
| WO | WO 01/74667 A1 | | 10/2001 |
| WO | WO 01/96184 A1 | | 12/2001 |
| WO | WO 02/53390 | | 7/2002 |

OTHER PUBLICATIONS

3M Innovative Properties Co., "3M–Matic™ Print and Seal Applicator PS2000" Brochure, © 2000.

3M, "3M–Matic™ Tape Application Sensor Kit, Type 19300" Brochure, © 2000.

3M, "3M–Matic™ S–857 'L' Clip Applicator, Type 29500" Instructions and Parts List, © 1998.

ETIPACK Labeling and Coding Systems, "Strappy", Brochure.

ETIPACK Labeling and Coding Systems, "Drinfit, Drinjet, Drinedge, AP Euro", Brochure.

* cited by examiner

APPARATUS FOR PRINTING AND APPLYING TAPE AND METHODS OF PRINTING AND APPLYING TAPE

TECHNICAL FIELD

The present invention generally relates to an apparatus for printing and applying tape. The present invention relates more particularly to an apparatus that includes a printer for printing on tape, a tape puller that pulls the printed tape out from the printer, and an applicator that applies the printed tape to an object. The present invention also generally relates to methods of printing and applying tape to objects.

BACKGROUND OF THE INVENTION

Containers, packages, and boxes for storing and shipping products typically use box sealing tape, such as an adhesive tape, to secure the flaps or covers so that the container, package, or box will not accidentally open during normal shipment, handling, and storage. Box sealing tape maintains the integrity of a container, package, or box throughout its entire distribution cycle. Box sealing tape can be used on other parts of container, package, or box and on other substrates, and can be used to function in a manner similar to labels. These tapes can be made in roll or pad form, and can have information printed or otherwise applied to, or contained within or on, the tape.

These containers, packages, or boxes generally display information about their contents. This information most commonly located on the container, package, or box might include lot numbers, date codes, product identification information, and bar codes. The information can be placed onto the container, package, or box using a number of methods. These include preprinting the container, package, or box when it is manufactured, printing this information onto the container, package, or box at the point of use with an inkjet code that sprays a pattern of ink dots to form the image, or by using a flexographic ink rolling coding system. Other approaches include the use of labels, typically white paper with preprinted information either applied manually, or with an online automatic label applicator.

A recent trend in conveying information related to the product is the requirement to have the information specific for each container, package, or box. For example, each container, package, or box can carry specific information about its contents and the final destination of the product, including lot numbers, serial numbers, and customer order numbers. The information is typically provided on labels that are customized and printed on demand at the point of application onto the container, package, or box. This is typically known as the ability to print "variable" information onto a label before it is applied onto the container, package, or box. Two patents that disclose printed labels are U.S. Pat. Nos. 5,292,713 and 5,661,099. U.S. Pat. No. 2,492,908 discloses a label applying mechanism.

One system for printing variable information involves thermal transfer ink printing onto labels using an ink ribbon and a special heat transfer print head. A computer controls the print head by providing input to the head, which heats discrete locations on the ink ribbon. The ink ribbon directly contacts the label so that when a discrete area is heated, the ink melts and is transferred to the label. Another approach using this system is to use labels that change color when heat is applied (direct thermal labels). In another system, variable information is directly printed onto a box or label by an inkjet printer including a print head. A computer can control the ink pattern sprayed onto the box or label.

Both thermal transfer and inkjet systems produce sharp images. Inkjet systems include piezo, thermal, continuous, and drop-on-demand. With both inkjet and thermal transfer systems, the print quality depends on the surface on which the ink is applied. It appears that the best system for printing variable information is one in which the ink and the print substrate can be properly matched to produce a repeatable quality image, especially bar codes, that must be read by an electronic scanner with a high degree of reliability.

Regardless of the specific printing technique, the printing apparatus includes a handling system for guiding a continuous web of label tape to the print head, as well as away from the print head following printing for subsequent placement on the article of interest (for example, a box). To this end, the web of label tape is normally provided in a rolled form ("tape supply roll"), such that the printing device includes a support that rotatably maintains the tape supply roll. Further, a series of guide components, such as rollers, transfer plates, festoons, etc., are utilized to establish a desired tape path both upstream and downstream of the print head, with the terms "upstream" and "downstream" in reference to a tape transport path initiating at the tape supply roll and terminating at the point label application to the article of interest (e.g., a box). An exact configuration of the guide components is directly related to the form of the label tape.

In particular, label tape is provided as either a linered tape or as a linerless tape. As suggested by its name, linered tape includes both a tape defined by a print side and an adhesive side, and a release liner encompassing the adhesive side. The liner serves as the carrier for the label tape. With this configuration, the printing device normally includes components that, in addition to delivering the web to and from the print head, also peel the liner away from the label tape. While widely accepted, linered tape material is relatively expensive due to the cost associated with inclusion of the release liner. Further, the liner adds to the overall thickness, thereby decreasing the available length of label tape for a given tape supply roll diameter. A decreased label tape length requires more frequent changeovers of the tape supply roll (where the exhausted tape supply roll is replaced by a new roll), and therefore a loss in productivity. Additionally, because the liner material is typically paper, resultant fibers, debris, and dust can contaminate the printing mechanism, potentially resulting in a reduced print head life. Also, a die cut operation is typically performed on the label stock to generate labels of discrete size. The die cut operation is an additional manufacturing step (and therefore expense), and prevents implementation of a variable label length processing approach.

To overcome the above-described problems associated with linered label tape, a linerless format has been developed. Generally speaking, linerless label tapes are similar to the linered configuration, except that the liner is no longer included. Thus, the linerless label tape is defined by a non-adhesive side or backing formulated to receive printing ("print side") and an opposing side (or "non-print side") that often times carries an adhesive ("adhesive side"). By eliminating the liner, linerless label tapes have a greatly increased length for a given roll diameter, and eliminate many of the other above-listed processing concerns associated with linered label tape. However, certain other handling issues are presented.

In particular, as the web of linerless tape is pulled or extended from the supply roll, the adhesive side is exposed, and will readily adhere to surfaces, and in particular the guide components associated with the printing device. A common difficulty encountered in the handling of linerless label tape is "wrap-around", whereby the web adheres to and wraps around a roller otherwise in contact with the adhesive side. For example, with thermal transfer printing, a platen roller or drive roller is normally associated with the print head for supporting the label tape during printing by the print head and for driving the tape out the printer exit. In this regard, the adhesive side of the linerless tape is in contact with, and carried by, the drive roller. Invariably, instead of simply releasing from the drive roller, the adhesive side adheres to and wraps around the drive roller. This highly undesirable situation leads to printer malfunctions, such as misprinting, tape jams, etc. Wrap-around of the platen roller or drive roller is most commonly found in printing devices conforming with "next label out" protocol where, after the label is printed, it is immediately cut and applied to the article in question. In other words, there is no accumulation of printed labels between the print head and the application device, in contrast to typical "loose loop" systems where printed labels accumulate prior to cutting and thus includes guide components, such as festoons, to tension the linerless label tape off of the drive roller.

Many efforts have been made to address the "wrap-around" concern associated with linerless label tape in next label segment out printing systems, including those described in U.S. Pat. Nos. 5,674,345; 5,524,996; 5,487,337; 5,497,701; and 5,560,293. In summary, each of these references incorporates a device, such as a stripper bar, a stripper plate, or an air source, that interacts with the linerless label tape after it has undesirably adhered to the platen or drive roller. That is to say, the common technique for addressing drive roller wrap-around is to position a device adjacent the platen roller that effectively "scrapes" the linerless label tape off of the platen or drive roller in the event of platen or drive roller wrap-around.

Other efforts have been made to address the "wrap-around" concern associated with linerless label tape in printing systems, such as those described in U.S. Pat. Nos. 5,437,228; 5,940,107; 5,879,507; and EP 0637547 B1 and EP 0834404.

Various apparatuses and methods for printing on tape and applying a length of printed tape to articles are known in the art. For example, apparatuses for printing and applying tape are described in U.S. Pat. No. 6,049,347 (Ewert et al.), "Apparatus for Variable Image Printing on Tape," U.S. Pat. No. 6,067,103 (Ewert et al.) "Apparatus and Process for Variable Image Printing on Tape," PCT Publication WO 98/42578 (Lenkl) "Device and Method for Applying Linerless Labels," and PCT Publication WO 00/34131 (Faust et al.) "Variably Printed Tape And System For Printing And Applying Tape Onto Surfaces." 3M Company located in St. Paul, Minn. has sold print and apply case sealing applicators and print and apply corner sealing applicators under the brand name 3M-Matic as CA2000 Corner Label Applicator and PS2000 Print & Seal Applicator.

Print and apply label applicators are commercially available from Etipack, S.p.A. located in Cinesello Balsamo (Mich.), Italy under the brand names Drinjet, Drinfit, Drinedge and AP Euro. Tape dispensers are also commercially available from Etipack, S.p.A. located in Cinesello Balsamo (Mich.), Italy under the brand name Strappy. Although the commercial success of available print and apply tape or label applicators have been impressive, it is desirable to further improve the performance of applicators handling linerless label tapes which print on the tape and apply the tape to objects, such as packages or boxes, while minimizing or eliminating the concern of platen or drive roller wrap-around.

SUMMARY OF THE INVENTION

One aspect of the present invention provides an apparatus for printing and applying tape. This apparatus comprises: a tape supply holder; a printer for printing on tape; a tape puller for pulling printed tape from the printer; and a tape applicator for applying the printed tape to an object. In one preferred embodiment of the above apparatus, the tape puller keeps the printed tape under tension as the printed tape exits the printer.

In another preferred embodiment of the above apparatus, the tape puller is moveable between a first position adjacent the printer and a second position distant from the printer. In one aspect of this embodiment, when the tape puller moves from the first position to the second position, the tape puller pulls the printed tape in the path of the tape applicator. In another aspect of this embodiment, after the printer has finished printing, the tape puller releases the printed tape. In another aspect of this embodiment, the tape applicator includes a vacuum system, where after the tape puller releases the printed tape, the vacuum system holds the printed tape. In another aspect of this embodiment, the apparatus further comprises a tape cutter, where after the vacuum system holds the printed tape, the tape cutter cuts the printed tape to form a length of printed tape. In yet another aspect of this embodiment, the tape applicator is moveable between a first position and a second position to apply the printed tape to the object, and after the tape cutter cuts the printed tape, the tape applicator moves to the second position to apply the printed tape to an object. In another aspect of this embodiment, the printer includes a driven roller, when as the printer is printing the tape, the driven roller drives the tape along a tape path in a first direction, and when after the cutter cuts the printed tape, the driven roller drives the tape along the tape path in a second direction opposite the first direction.

In another preferred embodiment of the above apparatus, the apparatus includes a first actuator for moving the tape puller between the first position and the second position. In another preferred embodiment of the above apparatus, the tape applicator is moveable between a first position and a second position to apply the printed tape to the object. In another aspect of this embodiment, the apparatus includes a second actuator for moving the tape applicator between the first position and the second position. In another preferred embodiment of the above apparatus, the applicator further comprises a tape cutter. In yet another aspect of this embodiment, the tape applicator includes a vacuum system for holding the printed tape prior to application on an object. In another aspect of this embodiment, the apparatus further comprises a drive roller for pulling tape from the tape supply holder.

Another aspect of the present invention provides an alternative apparatus for printing and applying tape. This apparatus comprises: a tape supply holder; a printer; a gripper; a first actuator for moving the gripper between a first position adjacent the printer and a second position distant from the printer; and a tape applicator. In another preferred embodiment of the above apparatus, the gripper and actuator keep printed tape under tension as the printed tape exits the printer.

In another preferred embodiment of the above apparatus, when the gripper moves from the first position to the second position, the gripper pulls printed tape in the path of the tape applicator. In another aspect of this embodiment, after the printer has finished printing, the gripper releases the printed tape. In another aspect of this embodiment, the apparatus further comprises a vacuum system, where after the gripper releases the printed tape, the vacuum system holds the printed tape. In another aspect of this embodiment, the apparatus further comprises a tape cutter, where after the vacuum system holds the printed tape, the tape cutter cuts the printed tape to form a length of printed tape. In another aspect of this embodiment, the tape applicator is moveable between a first position and a second position to apply the printed tape to the object, and where after the tape cutter cuts the printed tape, the tape applicator moves to the second position to apply the printed tape to an object. In another aspect of this embodiment, the printer includes a driven roller, where as the printer is printing the tape, the driven roller drives the tape along a tape path in a first direction, where after the cutter cuts the printed tape, the driven roller drives the tape along the tape path in a second direction opposite the first direction.

In another preferred embodiment of the above apparatus, the tape applicator is moveable between a first position adjacent the printer and a second position to apply the printed tape to the object. In another aspect of this embodiment, the apparatus includes a second actuator for moving the tape applicator between the first position and the second position. In another preferred embodiment of the above apparatus, the apparatus further comprises a tape cutter. In another aspect of this embodiment, the tape applicator includes a vacuum system for holding the printed tape prior to application on an object. In another preferred embodiment of the above apparatus, the apparatus further comprises a driven roller for pulling tape from the tape supply holder.

Another aspect of the present invention provides a method of printing and applying tape, comprising the steps of: providing tape; printing on the tape with a printer; pulling printed tape under tension from the printer; and applying printed tape to an object. In one preferred embodiment of the above method, the pulling step occurs simultaneously during the printing step. In another preferred embodiment of the above method, the method comprising the further step of: prior to the applying step, holding the printed tape. In another aspect of this embodiment, the method comprising the further step of: after the holding step, cutting the printed tape to provide a length of printed tape. In another aspect of this embodiment, the pulling step includes pulling the printed tape across the path of a tape applicator for applying the printed tape to an object. In another aspect of this embodiment, after the printing step and pulling step are complete, releasing the printed tape. In another aspect of this embodiment, during the printing step, the tape moves along a tape path in the printer in a first direction, where after cutting step, the tape moves along the tape path in a second direction opposite the first direction. In another preferred embodiment of the above method, the applying step includes pushing on a non-adhesive side of the printed tape to apply an adhesive side of the printed tape to an object. In another aspect of this embodiment, the pushing step includes pushing the printed tape from a first position to a second position to apply the printed tape to the object across the direction of the pull step. In another preferred embodiment of the above method, the method further comprises the step of: providing an object where the printing step includes printing information on the tape corresponding to the object. In another aspect of this embodiment, the object is a package with contents, where the printing step includes printing information on the tape corresponding to the contents.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The apparatus for printing and applying tape prints information onto tape to form a length of printed tape and then applies the length of printed tape to an object, preferably a package or a box. The apparatus may vary the information printed on each length of printed tape and may vary the overall length of each length of printed tape, such that different lengths of printed tape may be produced from one supply roll of tape. The apparatus applies the length of printed tape onto an object, preferably a package or box, either while the package or box is stationary or while the box is moving (such as while the box is being closed and sealed). The apparatus can apply the length of printed tape anywhere on the package or box to serve as a conveyor of information. For example, the apparatus can apply the length of printed tape on the top, bottom, or sides of a package or box to convey information about the contents of the box. Alternatively, the apparatus can apply the length of printed tape along a seam of the box to convey information about the contents of the box and to seal the box.

Figure 1:
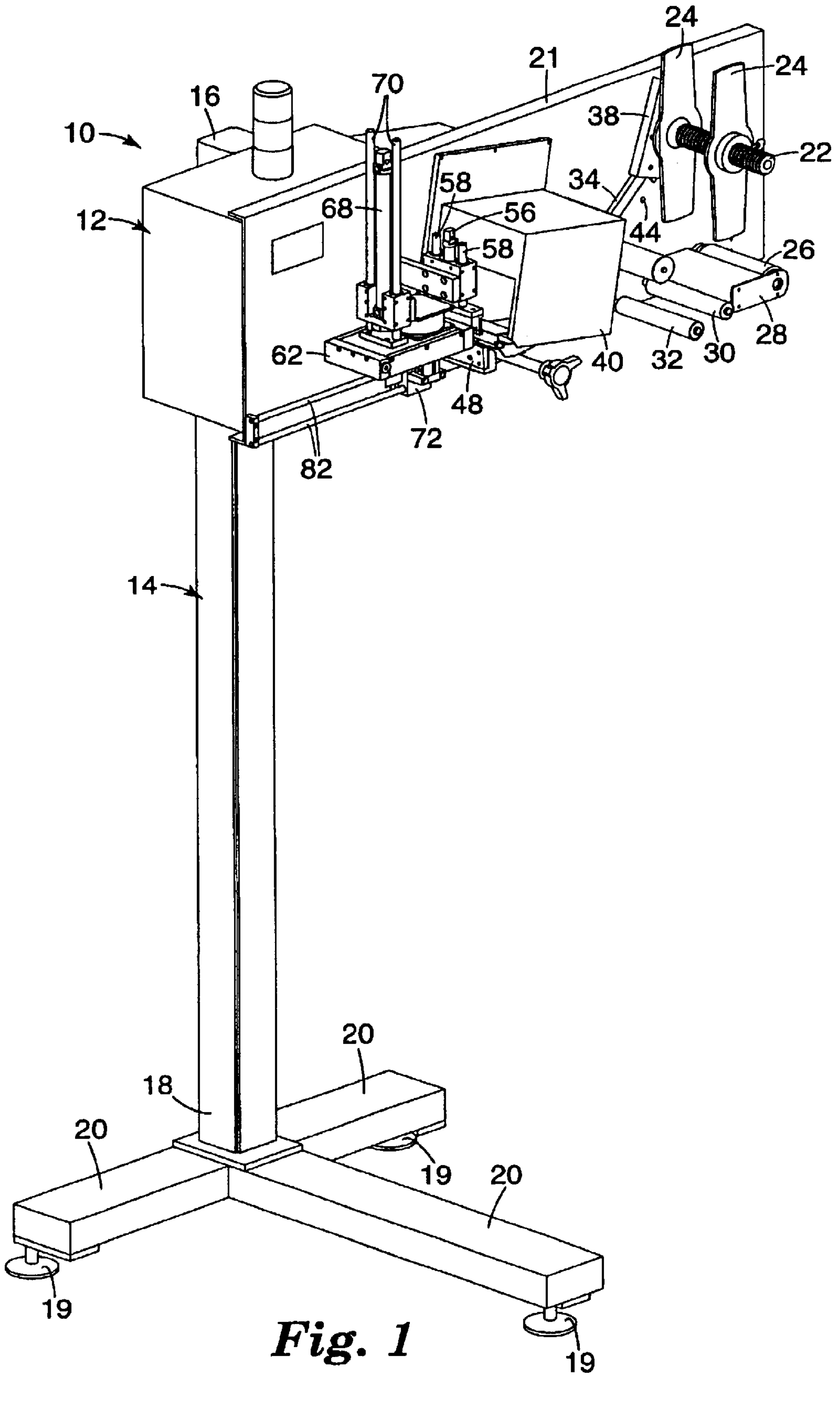
FIG. 1 is an isometric view of a preferred embodiment of the apparatus for printing and applying tape of the present invention in a first position to apply printed tape to the top of an object.
Figure 2:
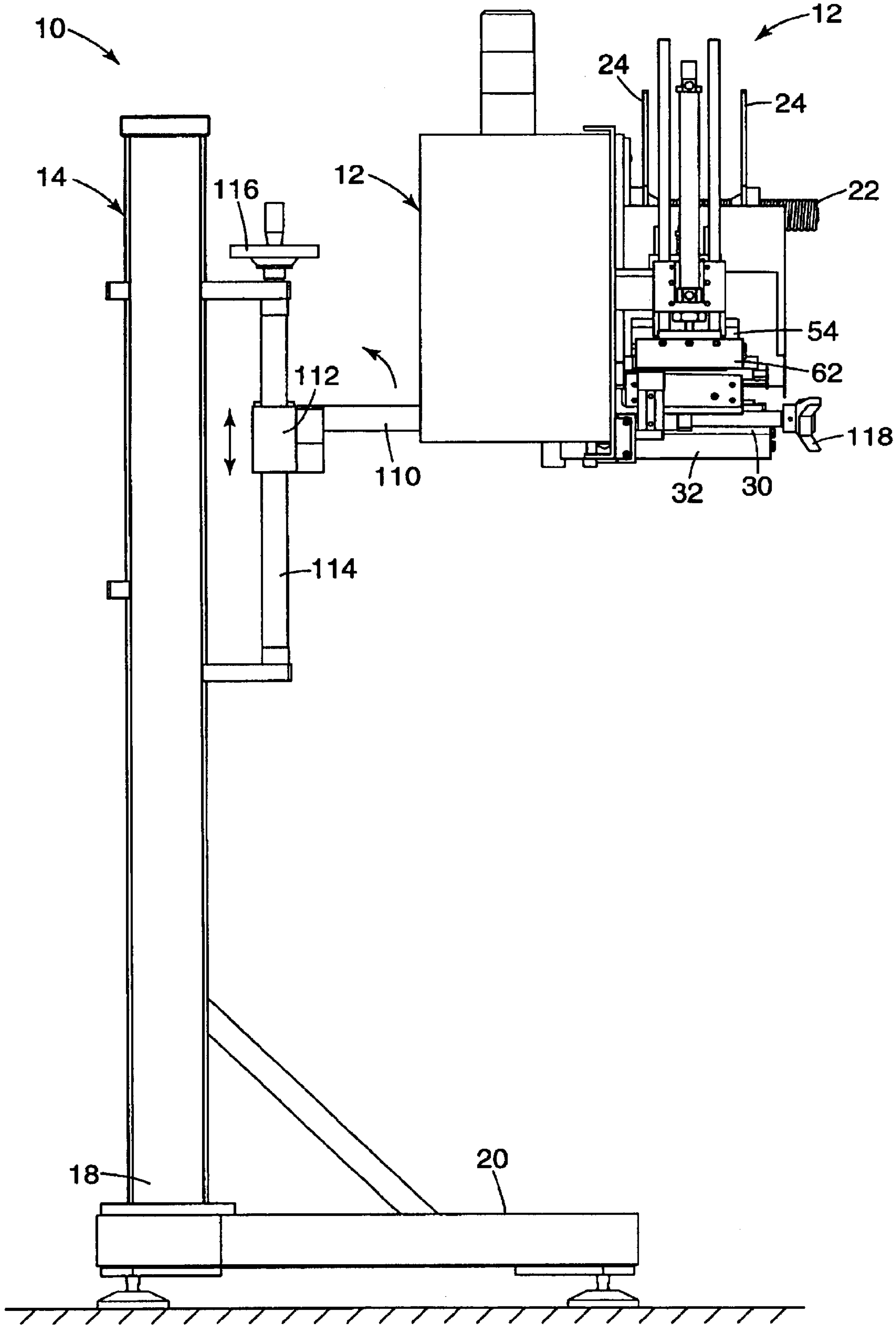
FIG. 2 is a front view of the apparatus for printing and applying tape of FIG. 1.

A preferred embodiment of an apparatus 10 for printing and applying tape of the present invention is illustrated in FIGS. 1 and 2. The tape applicator 10 includes a taping head 12 and a stand 14. The stand 14 includes a first end 16 and a second end 18 opposite the first end 16. The stand 14 includes preferably three legs 20 attached to the second end 18 of the stand 14 to support the stand 14 and the taping head 12. Each of the legs 20 includes at least one foot 19 for supporting the leg.

As illustrated in the FIG. 2, the taping head 12 is attached to the first end 16 of the stand 14. Preferably, the taping head 12 is slideably attached to a first rod 110 that is perpendicular to the stand 14. The tape head 12 may be moved anywhere along the first rod 110 by turning the lead screw 118. The first rod 110 is attached to the second rod 114 by slider assembly 112. The slider assembly 112 includes a pivot to allow the first rod 110 and the taping head 12 to rotate relative to second rod 114 to allow the taping head to be moved into an alternative position to apply tape to sides of boxes. The second rod 114 is perpendicular to the first rod 110. By turning the lead screw 116, the slider assembly 112 moves up or down the second rod 114 to adjust the height of the taping head 12 relative to the floor. The taping head 12 may be mounted on the stand 14 in any orientation or position that allows it to apply printed tape to an object.

Figure 3:
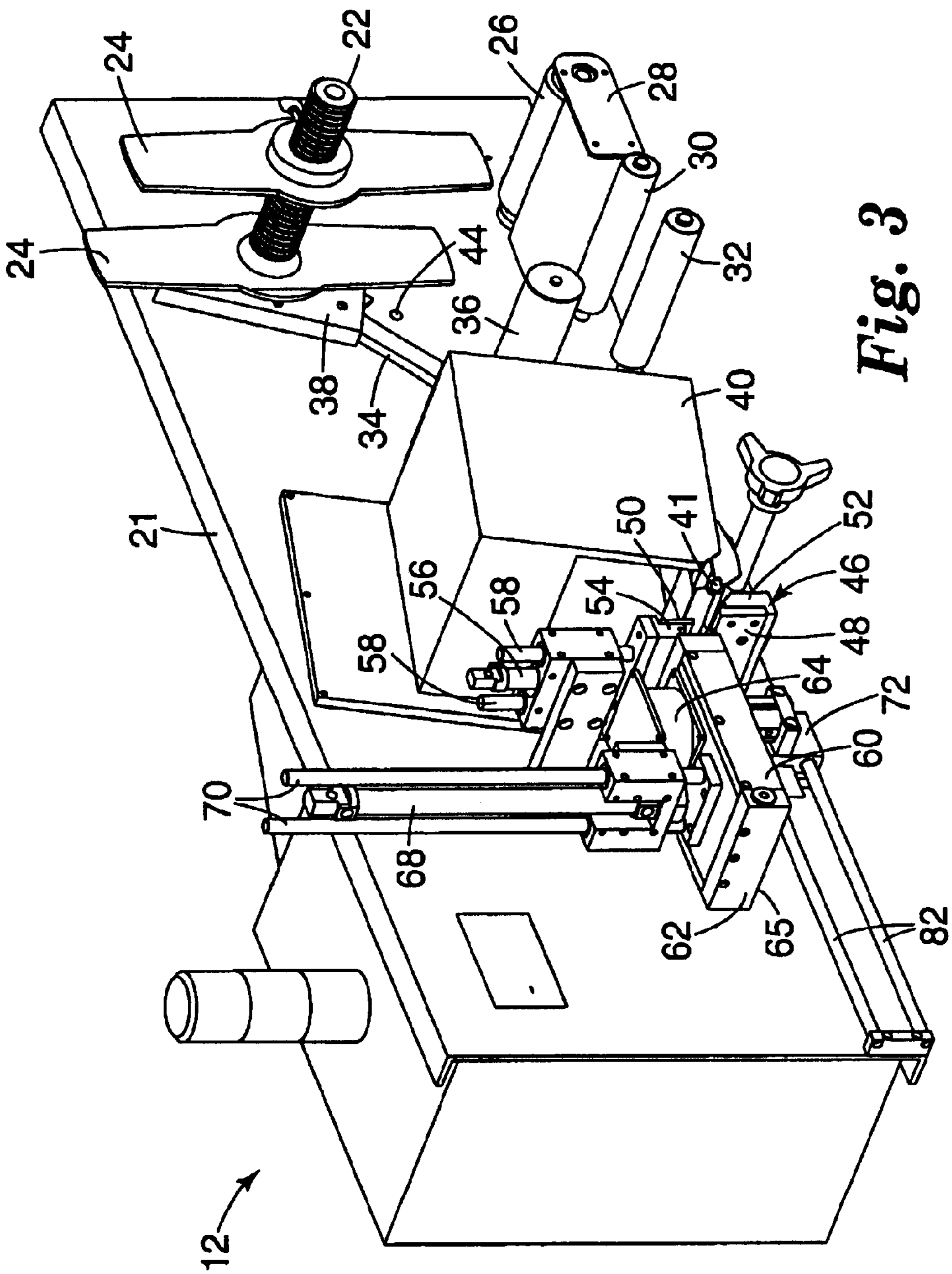
FIG. 3 is an isometric view of the taping head of the apparatus for printing and applying tape of FIG. 1.
Figure 4:
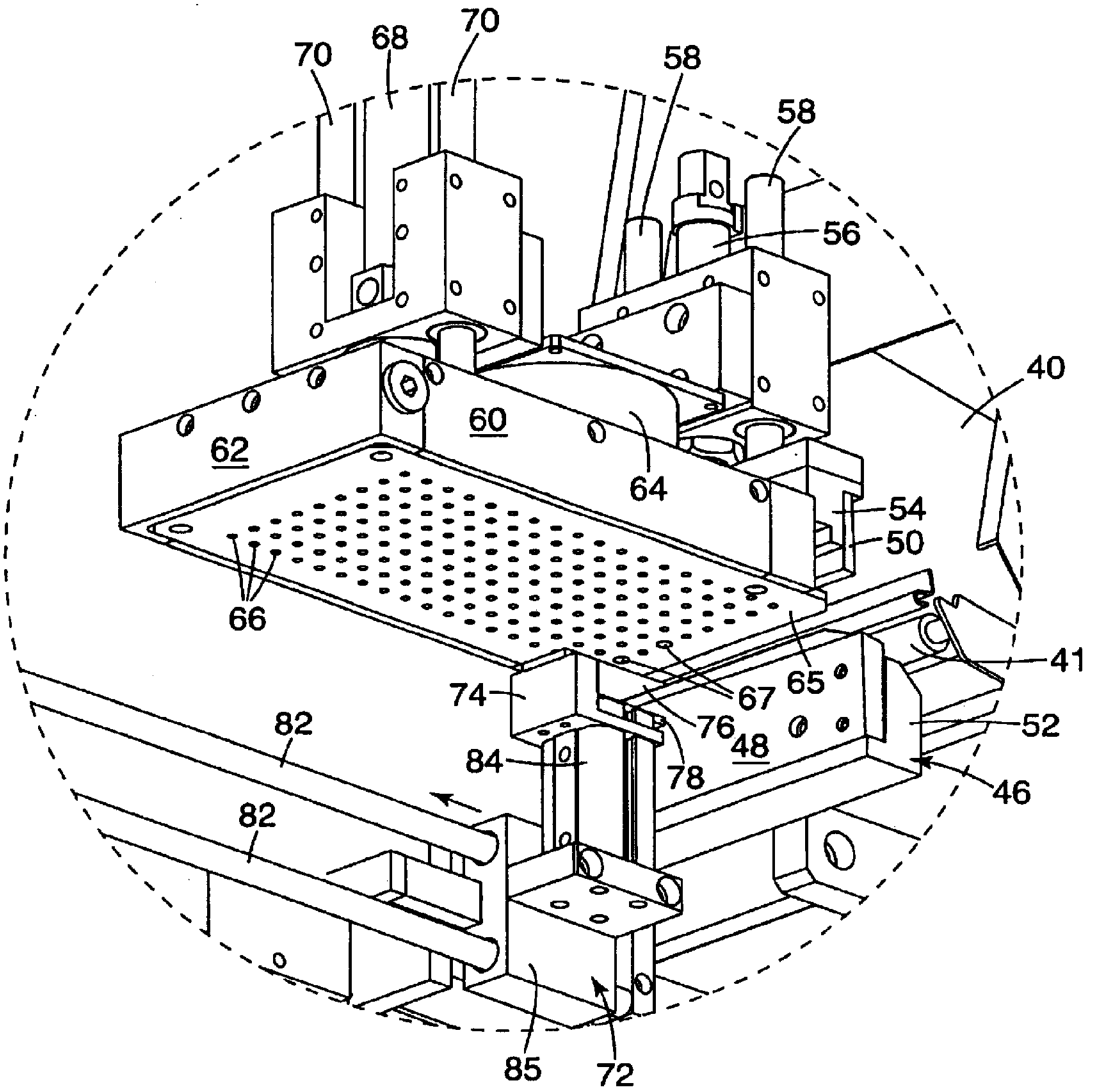
FIG. 4 is a blown-up view of the underside of the vacuum system and tape puller of the taping head of FIG. 3.

FIGS. 3 and 4 illustrate a preferred embodiment of the taping head 12 of the apparatus 10. FIGS. 3 and 4 are convenient for describing the parts of the taping head 12 and do not illustrate any tape in the taping head 12. FIGS. 5–9 illustrate the taping head 12 in operation including tape.

The taping head 12 includes a base 21. The taping head 12 includes a tape supply holder 22 attached to the base 21. When the term "attached" is use herein, it shall broadly-mean any way known in the art of attaching two items together either directly or indirectly to each other. The tape supply holder 22 preferably includes two opposing guides 24 for laterally supporting a roll of tape. Alternatively, the tape supply holder 22 could be configured to hold a stack of individual lengths of tape. The taping head 12 also includes a drive roller 26 and a support 28 attached to the base 21 for supporting the drive roller 26. A motor (not shown) drives the drive roller 26. The drive roller 26 assists in stripping or pulling tape from a tape roll that will be mounted in the tape supply holder 22. Idler rollers 30, 32 are attached to the base 21.

An accumulator 34 is attached to the base 21. In one preferred embodiment, the accumulator is a dancer arm 34 with an idler roller 36. The dancer arm 34 is attached to the base 21 by a pivot 38 opposite the idler roller 36. Alternatively, the accumulator 34 could be any mechanism known in the art that allows the tape to accumulate along a tape path in the taping head 12. For example, the accumulator 34 could be a linear slide, a festoon or a loose loop of tape. The taping head 12 also includes a sensor 44 attached to the base 21 located adjacent the dancer arm 34. An example of a suitable sensor 44 is commercially available as a proximity sensor from Turk Inc. located in Minneapolis, Minn. under part number Ni-4-S12-AN6X-H114.

Figure 5:
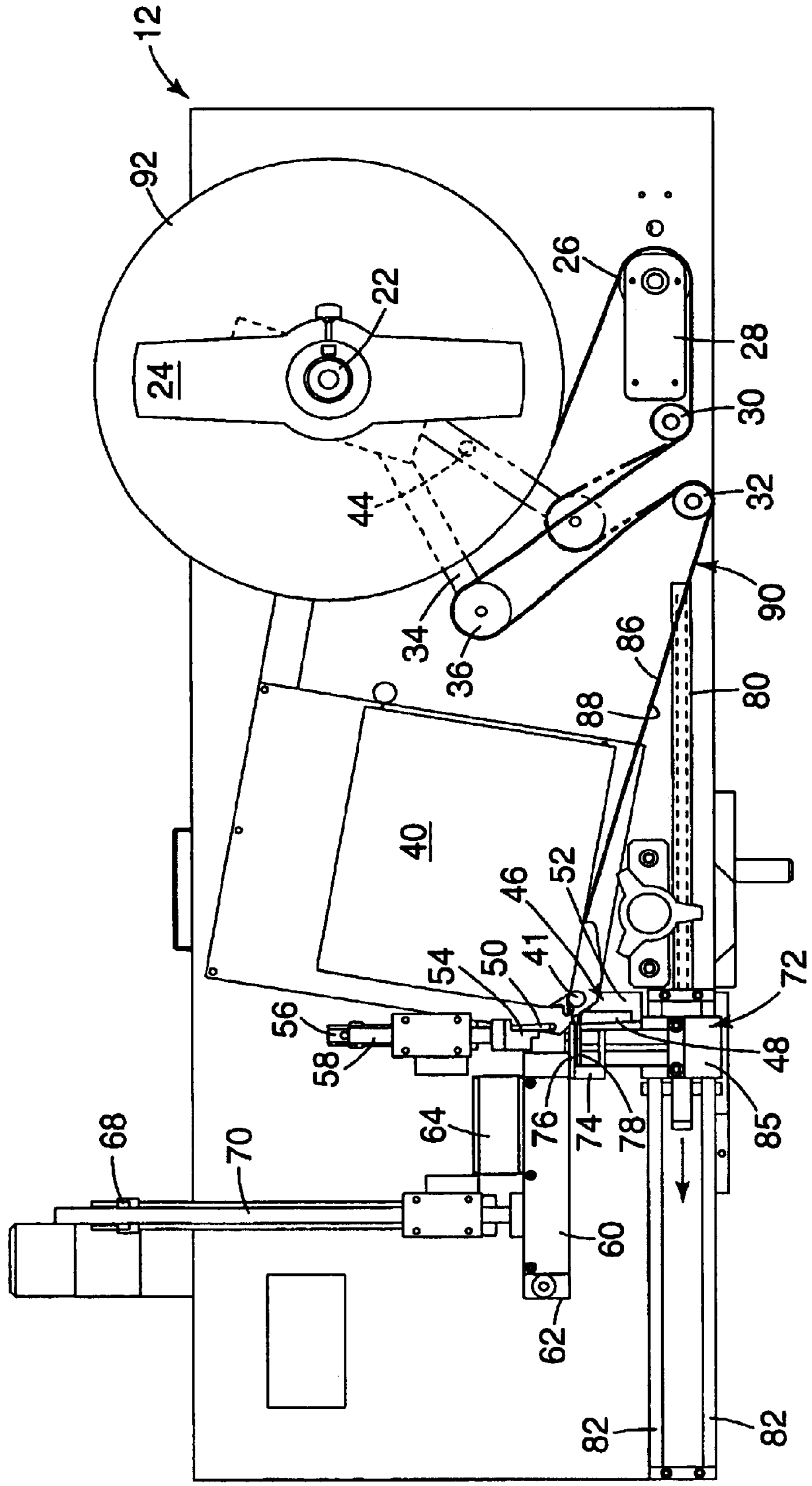
FIG. 5 is a side view of the taping head of FIG. 3, illustrating the tape puller starting to pull the tape from the printer.

FIG. 3 illustrates the dancer arm 34 in a first position. When the dancer arm 34 pivots counter clockwise from the first position to an alternative position or second position, the dancer arm 34 triggers the sensor 44. The dancer arm 34 includes a spring (not shown) that biases the dancer arm 34 into the first position. When sensor 44 is triggered, a signal is sent to the motor on the drive roller 26 to start rotating the roller 26 to pull tape from the tape supply roll. (FIG. 5 illustrates the first position of the accumulator 34 in solid lines and the second position of the accumulator 34 in dotted lines.) The dancer arm 34, the drive roller 26, idler rollers 30, 32, and sensor 44 are configured to help feed tape from the tape supply holder 22 to the entrance of the printer 40, while the printer prints on the tape. In another preferred embodiment, the taping head 12 could include a roller with a load cell sensor (instead of an accumulator 34), which senses when the tape is tensioned around the roller as it is being pulled toward the printer. When the sensor in the roller senses that the tape is being pulled around the roller to the printer, a signal is sent to the motor on the drive roller 26 to start rotating the roller 26 to pull tape from the tape supply roll. In either of the preferred embodiments, the taping head includes some type of mechanism that starts to pull tape from the tape supply roll when the printer 40 starts to print. This delivers the tape to the printer 40 in a uniform, low tension manner. Alternatively, other tape supply mechanisms known in the art may be used.

The taping head 12 includes a printer 40 attached to the base 21. The printer 40 preferably includes a drive roller 41 or platen roller 41 at the exit of the printer. Preferably, the drive roller 41 serves as a support surface or a platen for the tape as it is being printed by a print head opposite the drive roller 41. The drive roller 41 also pushes the printed tape out the exit of the printer as it rotates. Examples of a suitable printers 40 include a thermal transfer printer commercially available under model number M8485Se from Sato America Inc. located in Sunnyvale, Calif. or a thermal transfer printer under model number PE-42 from Datamax Inc. located in Orlando, Fla. or a thermal transfer printer under model DPM from NOVEXX OEM Printers and Labellers located in Philadelphia, Pa. In the case where a printer does not have a tape drive roller 41 for pushing the printed tape out the exit of the printer, the tape puller (explained below) independently could pull the tape of the printer. In this case, even though that type of printer may not have a driven platen roller, it may include an idle platen roller at the exit of the printer.

The taping head 12 includes a cutter 46 attached to the base 21 located adjacent the exit of the printer 40. The cutter 46 cuts the printed tape after the printer 40 prints on the tape and the tape exits the printer. In one embodiment, the cutter 46 preferably includes an upper blade 50 and a lower blade 48. The upper blade 50 is slideably attached to the base 21 by an upper blade support 54 and the lower blade 48 is attached to the base 21 by lower blade support 52. Preferably both blades 48, 50 are coated with an anti-stick coating, such as fluoropolymer or machine oil, to help prevent the tape from sticking to the blades and to minimize the transfer of the adhesive from the tape to the blades when the blades cut the tape. The cutter 46 also includes an actuator 56, which is preferably an air cylinder. The actuator 56 moves the upper blade support 54 and thus, the upper blade 50 in a vertical direction along guides 58 towards the lower blade 48. The lower blade 48 and lower blade support 52 are stationary. Alternatively, the actuator could move both blades 48, 50 to cut the tape. Alternatively, the actuator could move the lower blade 48 towards the upper blade 50. The upper blade 50 and lower blade 48 are preferably offset from each other, so that when the actuator 56 actuates the upper blade support 54, the upper blade slides next the lower blade 48, similar to a pair of blades of scissors. Alternatively, the tape cutter could be any cutter known in the art, for example, a single blade, a hot wire cutter, or a laser.

The taping head 12 includes a tape applicator 60 attached to the base 21 adjacent the cutter 46. The tape applicator temporarily holds the printed tape after it exits the printer 40 and then applies the printed tape to an object, preferably a package or a box. The tape applicator 60 is movable along an applicator path between a first position (illustrated in FIG. 3) and a second position (illustrated in FIG. 9) adjacent the object for applying the printed tape to the object. The tape applicator 60 moves between these two positions by use of an actuator 68 and guides 70. Preferably, the actuator 68 is an air cylinder. Preferably, the tape applicator 60 includes a vacuum system. The vacuum system includes a vacuum source 64 attached to a vacuum box 62 to hold the printed tape. Preferably, the vacuum source 64 includes two different types of vacuum sources. The first vacuum source is a low vacuum, high-flow source. A suitable example of this type of vacuum source 64 is commercially available as a fan from Grainger Industrial Supply located in St. Paul, Minn. under the brand Dayton, model number 4C548. The second vacuum source is a high vacuum, low-flow source. A suitable example of this type of vacuum source is commercially available as a vacuum pump, under the brand PIAB, model number M-20 from PIAB USA located in Hingham, Mass. The vacuum system 60 preferably includes a wipe down plate 65, which assists in initially adhering the length of printed tape to the object and assists in wiping down the printed tape as it is applied. The wipe down plate 65 preferably includes an actuator 61 for moving the wipe down plate 65 to apply the tape. The apparatus 10 could include an optional buffing assembly, which buffs the printed tape after it has been applied to the object.

The taping head 12 includes a tape puller 72 slideably attached the base 21 located beneath the tape applicator 60. The tape puller pulls the printed tape as the tape exits the printer 40. The tape puller 72 includes an actuator 80 (shown in FIGS. 5–9), which moves the tape puller from a first position adjacent the exit of the printer 40 to a second position that is distant from the exit of the printer 40. Preferably, the actuator 80 is an air cylinder.

FIG. 4 is convenient for describing the tape applicator 60 and the tape puller 72 in more detail. As mentioned above, the tape applicator 60 includes a low vacuum, high-flow source and high vacuum, low-flow source (shown collectively as the vacuum source 64), a vacuum box 62 attached to the vacuum source 64, and a wipe down plate 65 attached to the vacuum box 62. The low vacuum, high-flow source provides a vacuum through the vacuum box 62 and through holes 66 arranged throughout the wipe down plate 65. Preferably the wipe down plate 65 includes at least two holes 67 located closest to the cutter 46. The high vacuum, low-flow source provides a vacuum through the vacuum box 62 and through holes 67. It is preferred that the tape applicator 60 includes both types of vacuum sources for holding the tape to the tape applicator 60. If only the high vacuum, low-flow source was included, then all the holes in the vacuum box would need to be covered by the tape. If all the holes were not covered, then the vacuum would be lost and the tape applicator would not be able to adequately hold the tape. If only the low vacuum, high-flow source was included, then the tape would not be held securely or sufficiently by the tape applicator. By using both vacuum sources, the low vacuum, high-flow source gently holds the tape to the applicator through holes 66 all over the vacuum box 62 and the high vacuum, low-flow source securely holds the tape to the applicator through holes 67. It is preferable to hold the tape strongly to the tape applicator 60 closest to the tape cutter 46 because the tape might otherwise change position on the box 62 after the cutter 46 cuts the tape. In addition, the tape normally covers the two holes 67 and as a result, the vacuum is not lost.

As explained above, the tape puller 72 preferably includes a tape gripper 74 and an actuator 80 for moving the tape gripper 74 along rods 82. The tape gripper 74 preferably includes an upper jaw 76, which in the illustrated embodiment remains stationary, and a lower jaw 78, which is moved vertically by an actuator 84. Preferably, the actuator 84 is an air cylinder. The lower jaw 78 is moved toward the upper jaw by the actuator 84 to close the jaws on the tape and to grab the end of the tape as it leaves the printer 40 from drive roller 41. Alternatively, the upper jaw 76 may move and the lower jaw may be stationary or both jaws 76, 78 may move to close the jaws on the tape and to grab the end of the tape. Preferably, the lower jaw 78 includes an anti-stick coating along its surface, such as a coating of fluoropolymer or silicone to help prevent the adhesive from the tape from sticking to the lower jaw 78. The tape puller 72 is preferably configured to grab just enough of the end of the tape to adequately pull the tape from the printer, but not to grab too much of the tape so that the bottom jaw 78 sticks to the adhesive on the tape. For example, the jaws 76, 78 grab between 0.25 and 0.50 inches (0.635 cm to 1.27 cm) of the length of the tape, as it exits the printer 40. To reduce the contact surface area between the lower jaw 78 and the adhesive on the tape, the lower jaw 78 could include teeth, grooves, or other surface modifications. However, any portion of the tape extending from the printer could be grasped by the tape puller, so long as the tape puller can adequately disengage from the tape.

With respect to the gripper, the “upper” and “lower” jaw does not imply any orientation relative to up or down. The grippers maybe oriented sideways, or with the lower jaw above the upper jaw, depending on the application.

The tape gripper 74 is attached to a slider 85, which is slideably engaged with the rods 82. The actuator 80 moves the slider 86 and thus, the tape gripper 74, between a first position located adjacent the tape cutter 46 and printer 40 and a second position towards the opposite ends of the rods 82 away from the tape cutter 46 and printer 40. As the tape puller 72 moves from the first position to the second position opposite the first position, it pulls the tape from the printer 40 under or in the path of the tape applicator 60. Preferably, when the tape puller 72 is in the second position, it is clear from the line of the motion of the tape applicator, so when the tape applicator moves from a first position to a second position to apply the tape to the object, the tape applicator 60 can move without interference from the tape puller 72.

FIG. 5 is convenient for describing the preferred tape path through the taping head 12. A tape roll 92 is mounted on the tape supply holder 22 supported by the tape guides 24. The tape 90 includes a backing 86 and an adhesive 88 on the backing 86. An example of a suitable tape is commercially available as Scotch brand tape, No. 3340 from 3M Company, located in St. Paul, Minn. The tape 90 preferably moves along the following tape path within the taping head 12: a) from the tape supply holder 22 to the drive roller 26; b) then to the idler roller 30; c) then to the idler roller 36 on dancer arm 34; d) then to the idler roller 32; e) then to the entrance of the printer 40; f) then through the printer to the drive roller 41 at the exit of the printer 40; g) then between the upper blade 50 and the lower blade 48 of the tape cutter 46; and h) then to the upper jaw 76 and lower jaw 78 of the tape puller, which will pull the tape across the path of the tape applicator 60. When loading a new roll of tape 92 onto the tape supply holder 22, the tape is initially threaded through the taping head 12 according to the tape path outlined above.

The preferred sequence of operations of the apparatus 10 for printing and applying tape is illustrated in FIGS. 5–9 and is as follows.

FIG. 5 illustrates the taping head 12 before the printer 40 starts printing on the tape 90. To obtain this position, the first actuator 80 previously moved the tape puller 72 along the rods 82 (to the right in the Figure) to a first position adjacent the exit of the printer 40 and between the blades 48, 50 of the tape cutter 46. Also, the fifth actuator 84 previously moved the lower jaw 78 of the tape puller 72 to grasp the first end 96 of the tape 90 between the upper jaw 76 and the lower jaw 78. Once in this position, the first actuator 80 applies a force to move the tape puller away from the printer (to the left in the Figure). However, the force is not great enough to pull the tape 90 from the printer 40 when the printer 40 is not printing. The gripper moves as the printer feeds the tape out the exit of the printer. In this position, the tape 90 is being held under tension.

Figure 6:
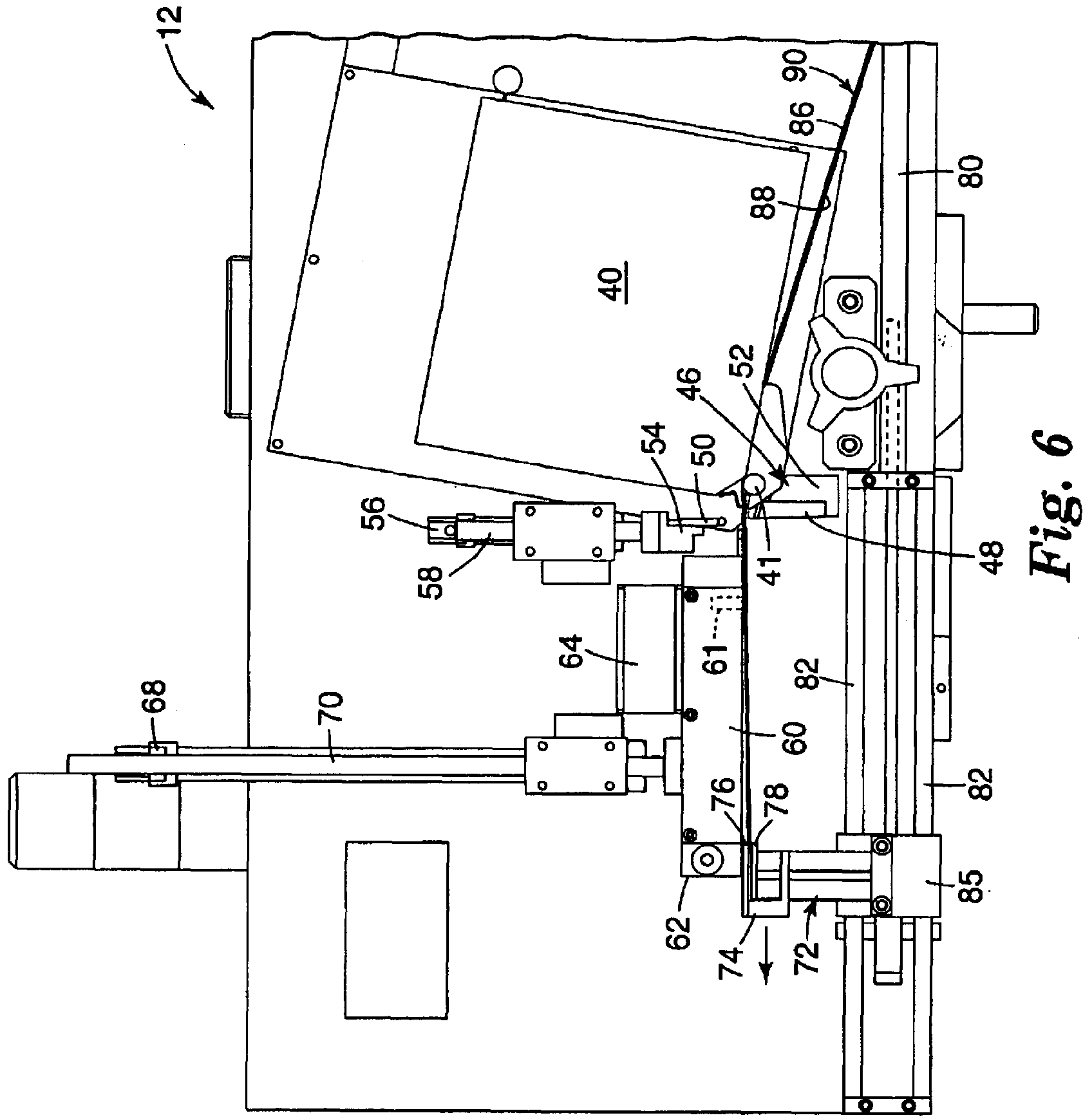
FIG. 6 is a side view of the taping head of FIG. 5, illustrating the tape puller pulling the printed tape from the printer as the printer prints the tape.

FIG. 6 illustrates the taping head 12 as the printer 40 is printing on the tape 90. Preferably, before the printer 40 prints, the vacuum system of the tape applicator 60 is turned on. As the printer 40 prints, the platen drive roller 41 rotates to push the tape 90 out of the exit of the printer 40. Because the tape 90 is being pulled under tension by the tape puller 72, the tape puller moves away from the printer and across the applicator path as the printer continues to feed out more printed tape 90. During this time, the tape is continuously under tension and is pulled directly out of the printer exit. Because it is pulled directly under tension from the printer exit, the tape does not tend to "wrap around" the drive roller 41. This configuration avoids the platen roller or drive roller "wrap-around" concern detailed in the Background section of this application. Without the use of the tape puller 72, the tape might wrap around the drive roller 41 as it rotates. The tape puller 72 will continue to move away from the printer, as indicated by the arrow, pulling the tape 90 through the path of the tape applicator 60 and keeping the tape under tension, until the printer 40 stops printing the tape. Once the printer stops printing, the tape puller 72 will continue to pull the tape 90, keeping the tape under tension. At this time, the tape puller 72 is moving towards the second position, which is located near the end of the rods 82 opposite the printer 40. As the tape puller 72 moves from the first position towards the second position, it will pull the tape 90 past the path of the tape applicator 60. The path of the tape applicator is the movement of the tape applicator 60 from its first position to its second position, as explained in more detail below.

Figure 7:
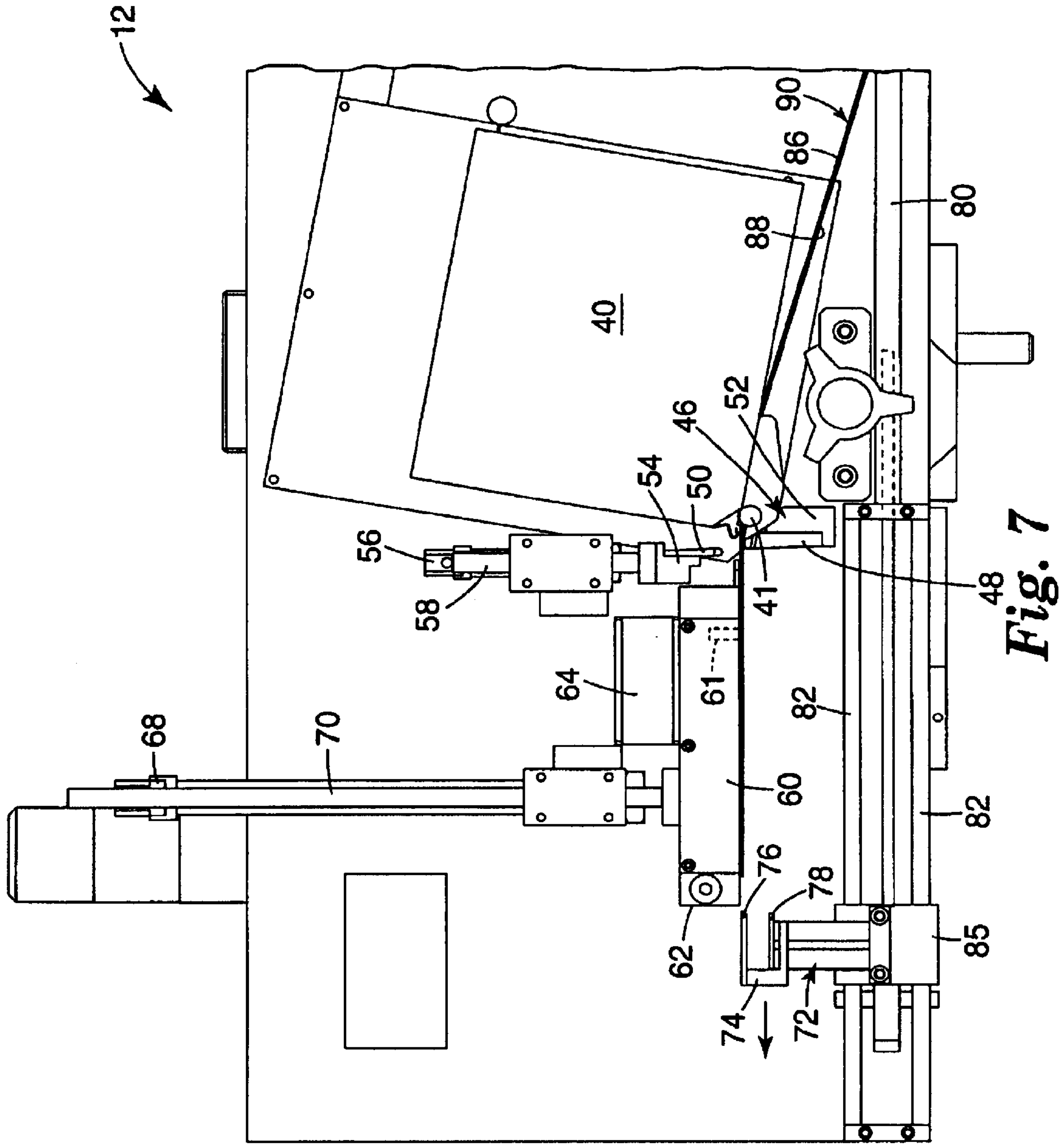
FIG. 7 is a side view of the taping head of FIG. 6, illustrating the tape puller releasing the printed tape, the tape applicator holding the printed tape, and the tape cutter cutting the tape.

After the printer 40 has stopped printing and is no longer feeding tape out the exit of the printer, a signal is sent to operate the fifth actuator 84 to move the lower jaw 78 of the tape puller away from the upper jaw 76. In doing so, the printed tape is released from the tape puller 72 and no longer under tension. Depending on the length of the printed tape, the tape puller may need to move out of the path of the tape applicator that moves later to apply the printed tape. For example, if the length of printed tape 90 is shorter than the length of the tape applicator 60, then after the tape is released by the tape puller 72, the actuator 80 may continue to push the tape puller away from the printer out of the path of the tape applicator, towards the second position located near the end of the bars 82. Because the vacuum system of the tape applicator 60 was previously turned on (prior to the printing step), the vacuum system draws the printed tape 90 toward the vacuum box 62. This step is illustrated in FIG. 7, with the tape applicator 60 holding the printed tape. The printed side of the tape 90 is in contact with the wipe down plate 65. The high vacuum, low-flow vacuum through holes 67 strongly holds the portion of the tape closest to the tape cutter 46 and printer 40, while the low vacuum, high flow vacuum through holes 66 loosely holds the other portion of the tape.

Figure 8:
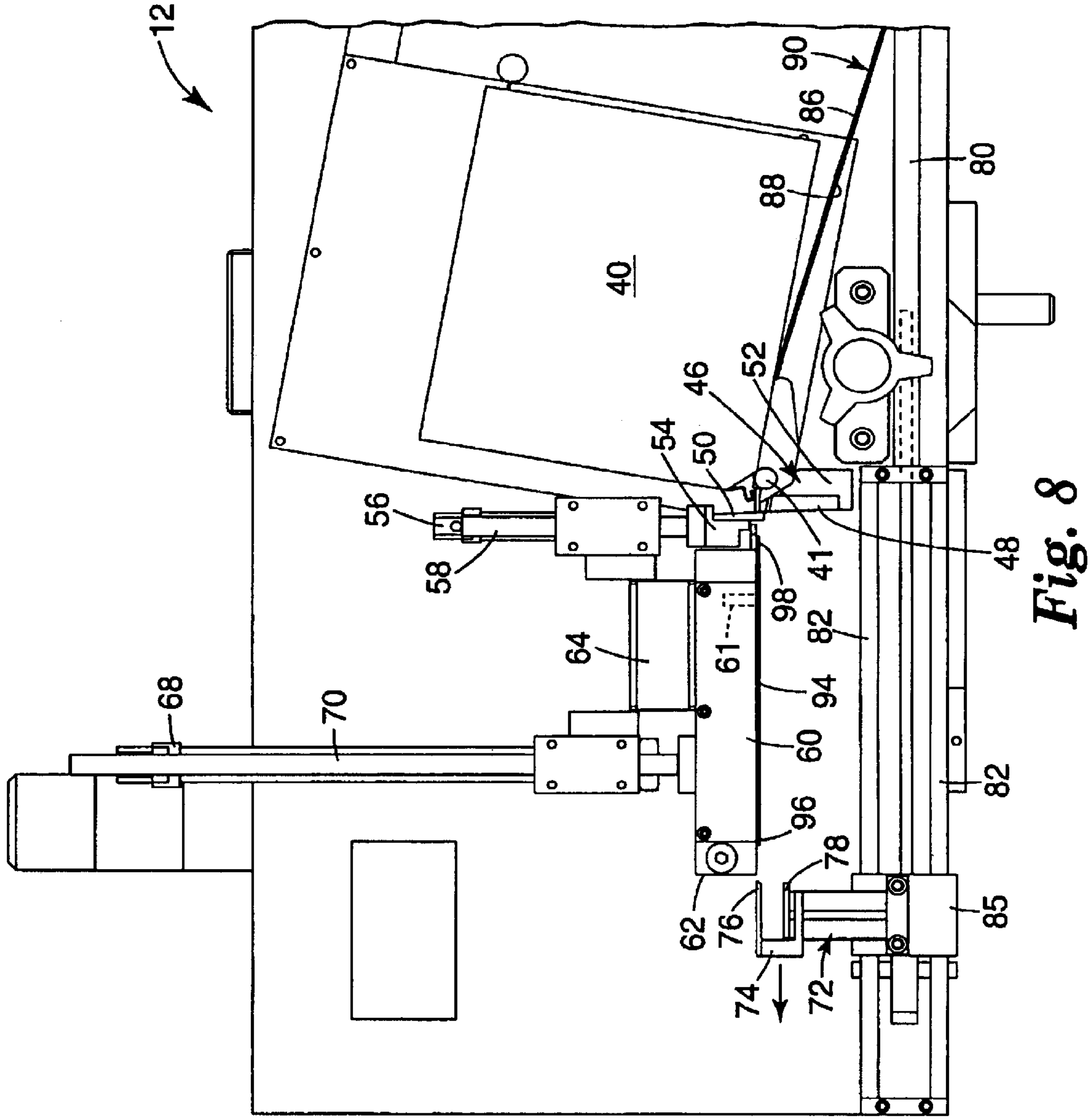
FIG. 8 is a side view of the taping head of FIG. 7, illustrating the tape applicator holding the length of printed tape.

FIG. 8 illustrates the cutter 46 cutting the tape. Once the printer 40 stops printing or feeding tape, and as a result, the tape puller 72 stops moving and is out from under the tape applicator 60, a signal is sent to the third actuator 56 on the tape cutter 46 to actuate the upper blade 50 downward to slide next to the lower blade 48 to cut the tape 90. After the tape 90 is cut, a length of tape 94 having a first end 96 and a second end 98 opposite the first end 96 is drawn towards the vacuum system 60 and held in place by the vacuum sources 64. The apparatus 10 is configured to cut various lengths of tape. After the tape is cut, the drive roller 41 rotates in a reverse direction (clockwise) as shown in FIG. 8 to back the tape away from the cutter 46. As the drive roller 41 rotates in the reverse direction, the accumulator 34 accommodates for the additional tape by rotating clockwise. The accumulator 34 provides back tension on the tape to keep it from adhering or wrapping around the drive roller 41. Preferably, the drive roller 41 backs the tape 90 up between 0.1 to 1 inches (0.254 cm to 2.54 cm) and more preferably, backs the tape 90 up between 0.08 to 0.12 inches (0.2 to 0.3 cm). There are three benefits to the drive roller 41 backing the tape away from the cutter. First, the adhesive on the tape 90 may have a tendency to stick to the cutter blades and by backing the tape away from the cutter, this helps pull the tape from the cutter blades. Second, the end of the tape 90 is nearly always is the same location after backing up the tape so this provides a predictable location for the tape puller 72 to grasp the end of the tape on the next cycle. Lastly, by backing up the tape, it helps maximize the print area of the tape by starting to print at a location closer to the first end of the tape.

The taping head 12 may also continue to feed tape after the printer 40 has finished printing. For example, if the taping head 12 is creating a six-inch (15.24 cm) length of printed tape, the printer may continue to feed tape for another half inch (1.27 cm) without printing such that the second end of the six-inch length is positioned closer to the blades of the cutter 46. After the cutter 46 cuts the length of tape to form a six inch length of tape, the drive roller of the printer will reverse to pull the extra half inch of tape back into the printer to start printing again.

Figure 9:
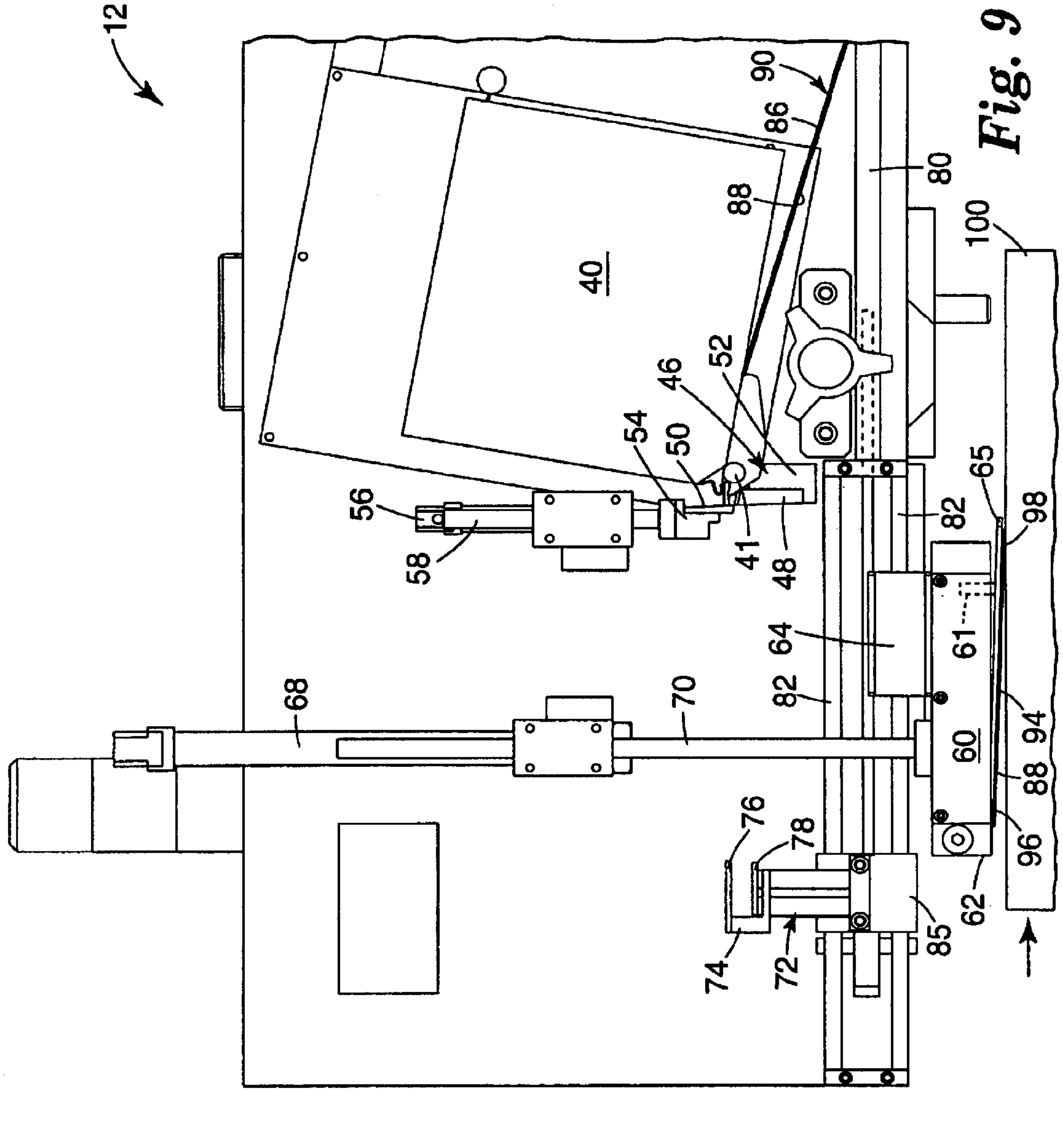
FIG. 9 is a side view of the tape head of FIG. 8, illustrating the tape applicator initially applying the length of printed tape to a box.

FIG. 9 illustrates the tape applicator 60 moved along the applicator path from the first position to a second position to apply the cut length of tape 94 being initially applied to an object 100, which is preferably a package or a box. As the tape applicator moves along the applicator path, is crosses perpendicular the prior tape puller path, when it moved from the first position to the second position. The second actuator 68 moves the tape applicator 60 with the length of tape held by the vacuum system. As the tape applicator 60 moves to the second position, the fourth actuator 61 pivots the wipe on plate 65 so as to adhere the second end 98 of the tape to the box 100. The adhesive 88 of the second end 98 of the cut length of tape sticks the tape to the box 100.

Figure 10:
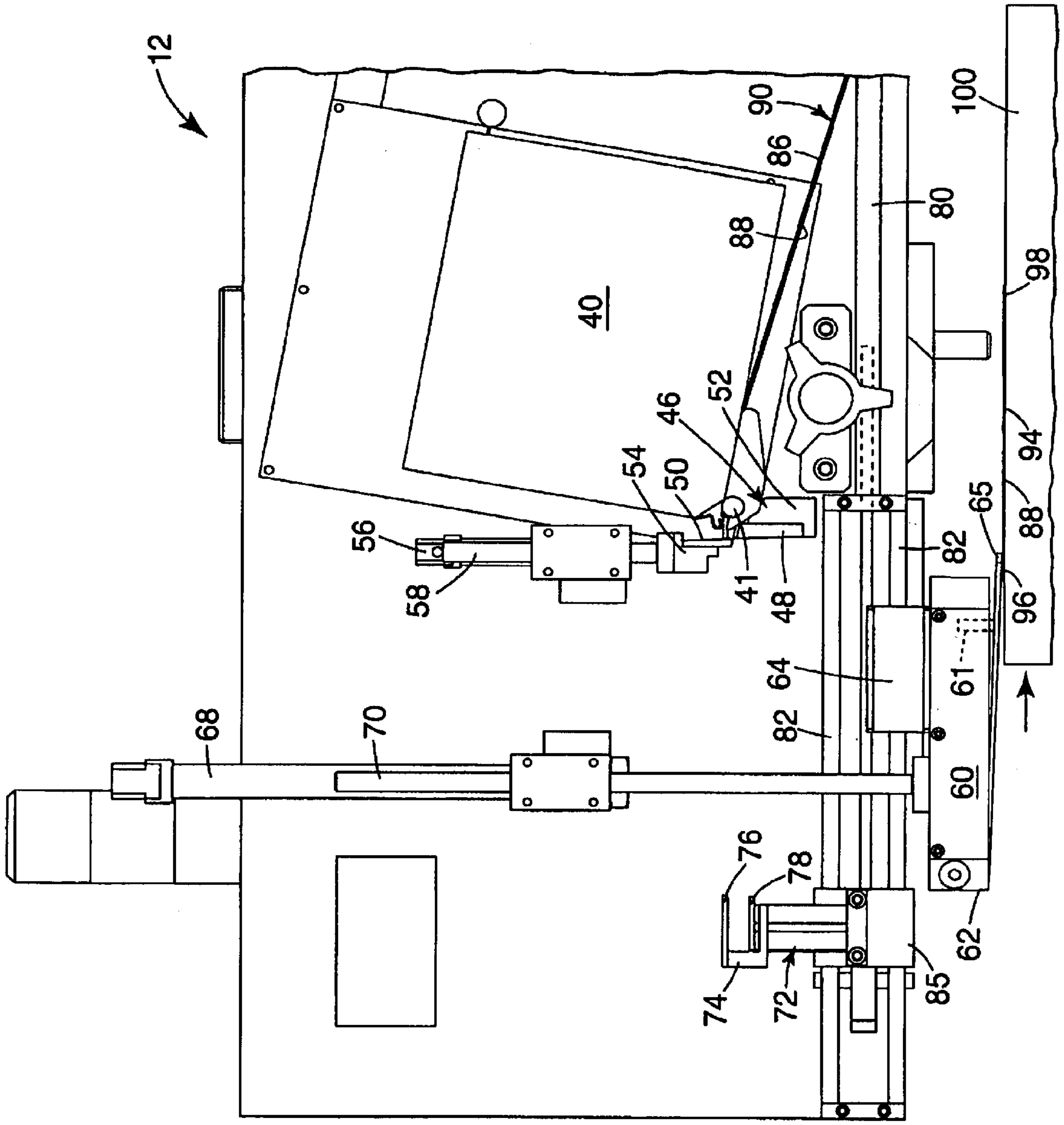
FIG. 10 a side view of the tape head of FIG. 9, illustrating the tape applicator finishing applying the length of printed tape to the box.

FIG. 10 illustrates the applicator 60 finishing applying the length of tape 94 to the box. As the box moves to the right, the wipe on plate 65 wipes down the entire length of tape 94 along the box, including the first end 96 of the tape 94. The adhesive 88 of the cut length of tape sticks the tape to the box 100.

Based on the teachings of this application, one skilled in the art could make various modifications to the apparatus or sequence of the operations describe above. For example, in one embodiment, the vacuum sources 64 could be turned on to operate just before the tape puller 72 releases the tape instead of the vacuum sources 64 operating during the entire time the tape puller 72 is pulling the tape under the tape applicator 60. In another embodiment, the tape puller 72 could include any suitable mechanism to pull the tape, such as only one jaw or member or a stick-on plate as for grabbing the adhesive side of the tape. Once the printer has finished printing the tape and the tape remains stationary, the tape puller 72 could continue to move to disengage the jaw, member or stick-on plate from the adhesive side of the tape. In another embodiment, the tape puller 72 could include a roller instead of two jaws 76, 78 for grabbing the adhesive side of the tape. In this embodiment, the roller would remain stationary when the tape puller attaches the roller to the adhesive side of the tape and when the tape puller moves to the second position. What is important is that the puller maintains the tape under tension as it is pulled across the tape applicator path. Once in the second position, the tape puller would continue to move to the left and the roller would rotate to release the tape from the roller. In another embodiment, the tape puller 72 could include any combination of rollers or jaws for pulling the tape from the printer.

In yet another embodiment, the tape applicator could temporarily hold the tape by static charge, by pressure-sensitive adhesive or other means known in the art instead of a vacuum system tape applicator temporarily holding the length of tape 94. In this embodiment, the tape applicator 60 could move to an intermediate position between the first position and the second position to temporarily adhere the printed tape to the tape applicator and then proceed to the second position to adhere the printed tape to the box. In another embodiment, the tape applicator 60 does not need to include a wipe on pate 65. Instead, the tape applicator 60 could attach the printed tape 94 to the box by tamping the printed tape on the package or box. The box may be stationary while the tape applicator 60 tamps the printed tape on the package or box or the tape applicator 60 could e move in the same direction as the box moves, when the tape applicator tamps the printed tape on the box. In another embodiment, the tape applicator could be stationary and tamp the printed tape on the box as the box moves past the applicator. In another embodiment, the tape applicator could include an air source for blowing the printed tape off the applicator onto the box to apply the printed tape to the box. In another embodiment, the tape cutter 46 and the tape applicator 60 could be one mechanism. In this embodiment, a single blade would be attached to the tape applicator 60. As the tape applicator and blade move from the first position, above the printed tape, to the second position to apply the tape, the blade would cut through the tape and the vacuum system of the tape applicator would draw the cut tape to the vacuum box. The tape applicator and blade would then move the second position to apply the printed tape to the box. The blade could be configured to not contact the box when the applicator applies the printed tape to the box. In another embodiment, the tape cutter could be a single blade or hot wire cutter mounted to the tape head located below the exit of the printer. In this embodiment, as the tape applicator moves from the first position to the second position, the tape applicator would bring the printed tape 94 past the stationary blade or hot wire, thus cutting through the tape.

Examples of suitable actuators for the first actuator 80 for moving the tape puller 72, the second actuator 68 for moving the tape applicator 60, the third actuator 56 for moving the tape cutter, the fourth actuator 61 for moving the wipe on plate 65, and the fifth actuator 84 for moving the lower jaw 78 of the tape puller 72 are commercially available as air cylinders, model number CM2C25-100A from SMC Corporation of America located in Eden Prairie, Minn. and air cylinders, model number, DSNU-16250-PPV-A, available from Festo Corporation located in Hauppauge, N.Y. Although the apparatus 10 is illustrated as including five actuators, the apparatus may include any number of actuators.

Preferably, the apparatus 10 for printing and applying tape includes a programmable logic controller for operating the various actuators, sensors, motors, and the printer in particular sequence. A suitable example of a commercially available controller is available as a controller under the brand name Micrologix, model number 1000 1761-L32BB from Allen Bradley located in Milwaukee, Wis.

The apparatus 10 for printing and applying tape prints information on a length of tape and then applies that length of tape to an object, preferably a box or package. The information printed on the tape can include a wide variety of information about the package or box to which it is adhered. For example, the printed length of tape may identity of the package or items in the package. It may include information about the shipping address, movement history of the package or about the items in the package, or about the weight of the items or package. The printed length of tape may include information about the contents of the package such as an inventory of the contents, value and manufacturer of the items in the package, when the package was sealed, hazard information regarding the contents of the package or transportation codes of the contents or package, required storage conditions of the package, or date of manufacture of the contents or warranty information concerning the contents.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An apparatus for printing and applying tape, comprising:
- a tape supply holder;
- a printer for printing on tape;
- a tape puller for pulling printed tape from said printer, said tape puller being laterally moveable relative to said printer;
- a tape cutter for cutting tape pulled from said printer;
- a tape applicator for applying the printed tape to an object, said tape applicator being adapted to contact only one side of the printed tape; and
- a vacuum system for holding the printed tape prior to application on an object.

2. The apparatus of claim 1, wherein said tape puller keeps the printed tape under tension as the printed tape exits said printer.

3. The apparatus of claim 1, wherein said tape puller is moveable between a first position adjacent said printer and a second position distant from said printer.

4. The apparatus of claim 3, wherein when said tape puller moves from said first position to said second position, said tape puller pulls the printed tape in the path of said tape applicator.

5. The apparatus of claim 4, wherein after said printer has finished printing, said tape puller releases the printed tape.

6. The apparatus of claim 5, wherein after said tape puller releases the printed tape, said vacuum system holds the printed tape.

7. The apparatus of claim 6, further comprising a tape cutter, wherein after said vacuum system holds the printed tape, said tape cutter cuts the printed tape to form a length of printed tape.

8. The apparatus of claim 7, wherein said tape applicator is moveable between a first position and a second position to apply the length of printed tape to the object, and wherein after said tape cutter cuts the printed tape, said tape applicator moves to said second position to apply the length of printed tape to an object.

9. The apparatus of claim 7, wherein said printer includes a drive roller, wherein as said printer is printing the tape, said drive roller drives the tape along a tape path in a first direction, wherein after said cutter cuts the printed tape, said drive roller drives the tape along the tape path in a second direction opposite said first direction.

10. The apparatus of claim 3, wherein said apparatus includes a first actuator for moving said tape puller between said first position and said second position.

11. The apparatus of claim 1, wherein said tape applicator is moveable between a first position and a second position to apply the length of printed tape to the object.

12. The apparatus of claim 11, wherein said apparatus includes a second actuator for moving said tape applicator between said first position and said second position.

13. The apparatus of claim 1 further comprising a drive roller for pulling tape from said tape supply holder.

14. An apparatus for printing and applying tape, comprising:

- a tape supply holder;
- a printer;
- a gripper;
- a cutter having cutting elements;
- a first actuator for moving said gripper from a first position between said cutting elements to a second position distant from said cutter; and
- a tape applicator.

15. The apparatus of claim 14, wherein said gripper and said actuator keep printed tape under tension as the printed tape exits said printer.

16. The apparatus of claim 14, wherein when said gripper moves from said first position to said second position, said gripper pulls printed tape in the path of said tape applicator.

17. The apparatus of claim 16, wherein after said printer has finished printing, said gripper releases the printed tape.

18. The apparatus of claim 17 further comprising a vacuum system, wherein after said gripper releases the printed tape, said vacuum system holds the printed tape.

19. The apparatus of claim 18, wherein said apparatus is adapted such that after said vacuum system holds the printed tape, said tape cutter cuts the printed tape to form a length of printed tape.

20. The apparatus of claim 19, wherein said tape applicator is moveable between a first position and a second position to apply the length of printed tape to the object, and wherein after said tape cutter cuts the printed tape, said tape applicator moves to said second position to apply the length of printed tape to an object.

21. The apparatus of claim 20, wherein said printer includes a drive roller, wherein as said printer is printing the tape, said drive roller drives the tape along a tape path in a first direction, wherein after said cutter cuts the printed tape, said drive roller drives the tape along the tape path in a second direction opposite said first direction.

22. The apparatus of claim 14, wherein said tape applicator is moveable between a first position adjacent said printer and a second position to apply the printed tape to the object.

23. The apparatus of claim 22, wherein said apparatus includes a second actuator for moving said tape applicator between said first position and said second position.

24. The apparatus of claim 14, wherein said tape applicator includes a vacuum system for holding the printed tape prior to application on an object.

25. The apparatus of claim 14 further comprising a drive roller for pulling tape from said tape supply holder.

26. A method of printing and applying tape, comprising the steps of:

- providing tape;
- gripping the tape with a laterally moveable tape puller;
- printing on a segment of the tape with a printer, wherein the tape segment is gripped by the tape puller prior to printing;
- pulling the printed tape segment under tension from the printer with the tape puller;
- cutting the printed tape segment; and
- applying printed tape to an object.

27. The method of claim 26, wherein the pulling step occurs during the printing step.

28. The method of claim 26 further comprising the step of:

prior to the applying step, holding the printed tape.

29. The method of claim 28, further comprising the step of:

after the holding step, cutting the printed tape to provide a length of printed tape.

30. The method of claim 29, wherein the pulling step includes pulling the printed tape across the path of a tape applicator for applying the printed tape to an object.

31. The method of claim 29, wherein during the printing step, the tape moves along a tape path in the printer in a first direction, wherein after cutting step, the tape moves along the tape path in a second direction opposite said first direction.

32. The method of claim 28, further comprising the step of releasing the printed tape after the printing step and pulling step are complete.

33. The method of claim 26, wherein the applying step includes pushing on a non-adhesive side of the printed tape to apply an adhesive side of the printed tape to an object.

34. The method of claim 33, wherein the pushing step includes pushing the printed tape from a first position to a second position to apply the printed tape to the object across the direction of the pull step.

35. The method of claim 26, further comprising the step of:

providing an object, wherein the printing step includes printing information on the tape corresponding the object.

36. The method of claim 35, wherein the object is a package with contents, and wherein the printing step includes printing information on the tape corresponding to the contents.

37. The method of claim 26, wherein the step of pulling the printed tape segment with a tape puller includes delivering the tape segment to a tape applicator prior to the step of cutting the printed tape segment.

38. The method of claim 26, wherein pulling the printed tape with a tape puller includes moving the tape puller in a linear fashion from a first position adjacent the printer to a second position within a tape path of a tape applicator.

* * * * *

UNITED STATES PATENT AND TRADEMARK OFFICE

CERTIFICATE OF CORRECTION

PATENT NO. : 6,884,312 B2
DATED : April 26, 2005
INVENTOR(S) : Mitchell, Michael R. et al.

It is certified that error appears in the above-identified patent and that said Letters Patent is hereby corrected as shown below:

Title page,
Item [56], References Cited, U.S. PATENT DOCUMENTS, delete "Dahiquist" and insert -- Dahlquist --.

Column 14,
Line 55, after "in" delete "the" and insert -- a --.
Line 62, after "claim 6," delete "further comprising a tape cutter,".

Column 16,
Line 32, delete "wherein" and insert -- where --.

Signed and Sealed this

Twenty-third Day of August, 2005

JON W. DUDAS
*Director of the United States Patent and Trademark Office*